(12) United States Patent
Min et al.

(10) Patent No.: US 12,333,850 B2
(45) Date of Patent: Jun. 17, 2025

(54) FINGERPRINT IDENTIFICATION METHOD, DEVICE, ELECTRONIC APPARATUS AND STORAGE MEDIUM

(71) Applicant: SAMSUNG ELECTRONICS CO., LTD., Suwon-si (KR)

(72) Inventors: Ying Min, Suwon-si (KR); Feng Zhu, Suwon-si (KR); Hanhui Li, Suwon-si (KR); Huaiwen Bai, Suwon-si (KR); Yunhao Zhang, Suwon-si (KR); Xiaochun Yan, Suwon-si (KR); Chunmiao Jiang, Suwon-si (KR); Wenyan Zheng, Suwon-si (KR); Yanjun Chen, Suwon-si (KR); Jiangbo Chen, Suwon-si (KR); Zhijie Lv, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 359 days.

(21) Appl. No.: 17/807,821

(22) Filed: Jun. 20, 2022

(65) Prior Publication Data
US 2023/0360429 A1 Nov. 9, 2023

(30) Foreign Application Priority Data

May 7, 2022 (CN) .......................... 202210493037.7

(51) Int. Cl.
*G06V 40/12* (2022.01)
*G06F 18/22* (2023.01)

(52) U.S. Cl.
CPC .......... *G06V 40/1371* (2022.01); *G06F 18/22* (2023.01); *G06V 40/1353* (2022.01); *G06V 40/1376* (2022.01)

(58) Field of Classification Search
CPC ......... G06F 18/22; G06F 21/32; G06V 40/12; G06V 40/1347; G06V 40/1353; G06V 40/1371; G06V 40/1376
See application file for complete search history.

(56) References Cited

U.S. PATENT DOCUMENTS

| 5,613,014 A | 3/1997 | Eshera et al. |
| 5,799,098 A | 8/1998 | Ort et al. |

(Continued)

OTHER PUBLICATIONS

Alshehri et al. "Cross-sensor fingerprint matching method based on orientation, gradient, and gabor-hog descriptors with score level fusion." IEEE Access 6 (2018): 28951-28968. (Year: 2018).*

(Continued)

*Primary Examiner* — Katrina R Fujita
(74) *Attorney, Agent, or Firm* — MORGAN, LEWIS & BOCKIUS LLP

(57) ABSTRACT

The present disclosure relates to a fingerprint identification method, device, an electronic apparatus and a storage medium. The fingerprint identification method includes: capturing a fingerprint by a fingerprint sensor, identifying matching pairs of minutiae between the captured fingerprint and a reference fingerprint; calculating a first matching result based on the minutia matching pairs; identifying minutia surrounding features for each minutia of the captured fingerprint in the minutia matching pairs; determining, for each minutia in the minutia matching pairs, whether the minutia surrounding features of the captured fingerprint match with minutia surrounding features of the reference fingerprint; calculating a second matching result based on the determination; and generating an identification result based on the first matching result and the second matching result.

20 Claims, 9 Drawing Sheets

(56) References Cited

U.S. PATENT DOCUMENTS

| | | | |
|---|---|---|---|
| 6,266,433 B1 | 7/2001 | Bolle et al. | |
| 6,282,304 B1* | 8/2001 | Novikov | G06F 21/83 |
| | | | 382/125 |
| 6,314,196 B1 | 11/2001 | Yamaguchi et al. | |
| 7,020,591 B1* | 3/2006 | Wei | G06V 40/1347 |
| | | | 703/2 |
| 7,340,080 B2* | 3/2008 | Liu | G06V 40/1376 |
| | | | 382/125 |
| 8,588,484 B2 | 11/2013 | Wang et al. | |
| 8,699,799 B2 | 4/2014 | Moon et al. | |
| 9,626,549 B1* | 4/2017 | Chen | G06V 40/1371 |
| 9,734,384 B2 | 8/2017 | Chandrashekhar et al. | |
| 10,599,910 B2 | 3/2020 | Hwang et al. | |
| 2003/0029913 A1 | 2/2003 | Tsukamoto et al. | |
| 2004/0062427 A1* | 4/2004 | Biswas | G06V 40/12 |
| | | | 382/125 |
| 2004/0125993 A1* | 7/2004 | Zhao | G06V 40/12 |
| | | | 340/5.53 |
| 2005/0129293 A1* | 6/2005 | Acharya | G06V 40/1365 |
| | | | 382/125 |
| 2005/0175225 A1* | 8/2005 | Shinzaki | G06V 40/1365 |
| | | | 382/124 |
| 2007/0230754 A1* | 10/2007 | Jain | G06V 40/1371 |
| | | | 382/125 |
| 2016/0314338 A1* | 10/2016 | Li | G06V 10/761 |
| 2016/0379038 A1 | 12/2016 | Vural et al. | |
| 2020/0218879 A1* | 7/2020 | Hara | G06V 40/1359 |
| 2022/0335750 A1* | 10/2022 | Vibert | G06V 40/1371 |
| 2023/0045850 A1* | 2/2023 | Sammoura | G06V 10/751 |

OTHER PUBLICATIONS

Feng et al. "Fingerprint matching using ridges." Pattern Recognition 39.11 (2006): 2131-2140. (Year: 2006).*

Jain et al. "Latent fingerprint matching." IEEE Transactions on pattern analysis and machine intelligence 33.1 (2010): 88-100. (Year: 2010).*

Lee et al. "Partial fingerprint matching using minutiae and ridge shape features for small fingerprint scanners." Expert Systems with Applications 87 (2017): 183-198. (Year: 2017).*

Meyers, Alyshia. The Assessment of Fingerprint Quality for a More Effective Match Score in Minutiae-Based Matching Performers. West Virginia University, 2017. (Year: 2017).*

Zheng et al. "A scheme for minutiae scoring and its application to fingerprint matching." 2008 7th World Congress on Intelligent Control and Automation. IEEE, 2008. (Year: 2008).*

* cited by examiner

FINGERPRINT IDENTIFICATION METHOD, DEVICE, ELECTRONIC APPARATUS AND STORAGE MEDIUM

CROSS-REFERENCE TO RELATED APPLICATION

This application claims priority under 35 U.S.C. § 119 to Chinese Patent 202210493037.7, filed on May 7, 2022, the disclosure of which is incorporated by reference herein in its entirety.

TECHNICAL FIELD

The present disclosure relates to information processing, more particularly to a fingerprint identification method, device, electronic apparatus, and storage medium.

DISCUSSION OF THE RELATED ART

Authentication is used to ensure the user of a portable device or a payment method is the intended user. For example, an electronic device, an alphanumeric password, or a numeric PIN may provide authentication for access and use of the portable device. A payment method may employ the ISO/IEC 7816 or ISO/IEC 14443 standard to authenticate a transaction. However, these standards do not necessarily ensure the payment method ("card") user is the intended user, and, if the card has left the intended user's possession, may not prevent fraudulent charges.

Some payment methods have employed biometric authentication, which compares a user's fingerprint captured at the point of use to a known reference fingerprint of the user. To confidently report a match between the fingerprints, several fingerprint algorithms have been developed. Most fingerprint identification algorithms are based on fingerprint minutia matching. Algorithms based on the fingerprint minutia matching have low complexity, small memory requirements, and small delay, and therefore are suitable for an embedded apparatus, such as a smart card, a fingerprint door lock, etc. However, fingerprint sensors within these domains have a small area, and can only collect partial fingerprints.

Fingerprint identification algorithms based on fingerprint minutiae have low accuracy in the identification of a partial fingerprint. This is because the number of minutiae on the partial fingerprint is small, and the overlapping area of fingerprints in different areas is small, resulting in fewer number of minutiae within the overlapping area and fewer number of minutiae that can be matched, which leads to the inability to distinguish different fingers and fingerprints of the same finger. There is a need in the art for accurate fingerprint matching methods that have fast response times, use little memory, and are able to reliably match with only partial fingerprints.

SUMMARY

The present disclosure provides a fingerprint identification method, device, electronic apparatus, a storage medium that are able to identify fingerprints based on partial fingerprints with increased accuracy.

A fingerprint identification method according to embodiments of the present disclosure includes: capturing a fingerprint by a fingerprint sensor, identifying matching pairs of minutiae between the captured fingerprint and a reference fingerprint; calculating a first matching result based on the minutia matching pairs; identifying minutia surrounding features for each minutia of the captured fingerprint in the minutia matching pairs; determining, for each minutia in the minutia matching pairs, whether the minutia surrounding features of the captured fingerprint match with minutia surrounding features of the reference fingerprint; calculating a second matching result based on the determination; and generating an identification result based on the first matching result and the second matching result.

The minutia surrounding features may include at least one of fingerprint direction strength information, binary pixel information and gray information of the periphery of the minutia. The determining of whether the minutia surrounding features of the captured fingerprint match the reference fingerprint may be performed more accurately by using at least one of the fingerprint direction intensity information, binary pixel information and gray information of the periphery of the minutia as the minutia surrounding feature, thereby facilitating to obtain a more accurate fingerprint identification result. In addition, the complexity of the matching based on the above minutia surrounding features is lower, so that a more accurate fingerprint recognition result may be obtained more efficiently.

The identifying of minutia surrounding features, and determining, for each minutia in the minutia matching pairs, whether the minutia surrounding features of the captured fingerprint match with minutia surrounding features of the reference fingerprint may include: extracting minutia surrounding features of the minutia of the captured fingerprint in each minutia matching pair based on an image of the captured fingerprint; acquiring pre-stored minutia surrounding features of the minutiae of the reference fingerprint; for each minutia matching pair, matching the minutia surrounding features of the minutia of the captured fingerprint in the minutia matching pair with the minutia surrounding features of the reference fingerprint and obtaining the second matching result according to the matching.

The identifying minutia surrounding features for each minutia of the captured fingerprint in the minutia matching pairs may include: generating a block, wherein the block has a predetermined size and is centered on the minutia of the captured fingerprint in each minutia matching pair in the image, and performing at least one of following operations: calculating a gradient in the block and acquiring, based on the calculated gradient, fingerprint direction strength in the block as the fingerprint direction strength information; acquiring binary information of each pixel in the block as the binary pixel information; and calculating a gray mean value and gray variance in the block as the gray information.

The generating of the block with a predetermined size centered on the minutia of the captured fingerprint in each minutia matching pair in the image may include: generating a fingerprint direction graph of the captured fingerprint and determining a direction of the block based on the fingerprint direction graph, wherein the direction of the block is based on where the minutia is located in the fingerprint direction graph. In subsequently performing the matching of the minutia surrounding features more accurately to obtain a more accurate second matching result, the method may determine the direction of the block as the direction of the position where the minutia is located in the fingerprint direction graph.

The determining, for each minutia in the minutia matching pairs, whether the minutia surrounding features of the captured fingerprint match with minutia surrounding features of the reference fingerprint and the calculating a second matching result based on the determination may include performing at least one of the following operations:

for each minutia matching pair, checking whether or not the fingerprint direction strength information of the periphery of the minutia matching pair matches, and obtaining the second matching result according to the matching; for each minutia matching pair, checking whether or not the binary pixel information of the periphery of the minutia matching pair matches, and obtaining the second matching result according to the matching; and for each minutia matching pair, checking whether or not the gray information of the periphery of the minutia matching pair matches, and obtaining the second matching result according to the matching.

The minutia surrounding features may further include information about at least one of following items: a ridge point of a ridge line where the minutia is located, the number of ridge lines between the minutia and a neighbor minutia, and the number of the neighbor minutiae of the minutia in a maximum common area that the corresponding minutia matching pair has. The effect of the matching check may be further improved by making the minutia surrounding features further include the information of at least one of the above items, thereby facilitating to obtain a more accurate fingerprint identification result.

The determining, for each minutia in the minutia matching pairs, whether the minutia surrounding features of the captured fingerprint match with minutia surrounding features of the reference fingerprint and the calculating a second matching result based on the determination may further include performing at least one of following operations: for each minutia matching pair, checking whether the ridge points of the ridge lines where the minutia matching pair is located match or not and obtaining the second matching result based on the ridge point according to the matching; for each two minutia matching pairs, checking whether the numbers of ridge lines corresponding thereto are similar or not and obtaining the second matching result based on the numbers of ridge lines according to a similarity degree; and for each minutia matching pair, checking whether the numbers of the neighbor minutiae in the maximum common area that the minutia matching pair has are similar or not and obtaining the second matching result based on the numbers of the neighbor minutiae according to the similarity degree. A more accurate fingerprint identification result may be obtained according to the first matching result and the second matching result, by obtaining more second matching results based on the minutia surrounding features.

The generating of an identification result of the captured fingerprint according to the second matching result and the first matching result may include: if the matching of the minutia surrounding features succeeds, increasing a value of the first matching result; and if the matching of the minutia surrounding features fails, decreasing a value of the first matching result, wherein a degree of adjustment to the first matching result is associated with a value of the second matching result.

A fingerprint identification device according to embodiments of the present disclosure includes: a fingerprint sensor configured to capture a fingerprint; a first matching unit configured to obtain minutia matching pairs between the captured fingerprint and a reference fingerprint, and to calculate a first matching result based on the minutia matching pairs; a second matching unit configured to identify minutia surrounding features for each minutia of the captured fingerprint in the minutia matching pairs, and to determine for each minutia in the minutia matching pairs, whether the minutia surrounding features of the captured fingerprint match with pre-stored minutia surrounding features of the reference fingerprint to obtain a second matching result; and an identification result determination unit configured to determine an identification result according to the second matching result and the first matching result.

The minutia surrounding features may include at least one of fingerprint direction strength information, binary pixel information and gray information of the periphery of the minutia.

The identifying of minutia surrounding features of each minutia of the captured fingerprint in the minutia matching pairs, and the obtaining of a second matching result may include: extracting minutia surrounding features of the minutia of the captured fingerprint in each minutia matching pair based on an image of the captured fingerprint; acquiring pre-stored minutia surrounding features of the minutiae of the reference fingerprint; for each minutia matching pair, matching the minutia surrounding features of the minutia of the captured fingerprint in the minutia matching pair with the minutia surrounding features of the reference fingerprint and obtaining the second matching result according to the matching.

The extracting of minutia surrounding features of the minutia of the captured fingerprint in each minutia matching pair based on an image of the captured fingerprint may include: determining a block with a predetermined size centered on the minutia of the captured fingerprint in each minutia matching pair in the image and performing at least one of following operations: calculating a gradient in the block and acquiring, based on the calculated gradient, fingerprint direction strength in the block as the fingerprint direction strength information; acquiring binary information of each pixel in the block as the binary pixel information; and calculating a gray mean value and gray variance in the block as the gray information.

The determining of a block with a predetermined size centered on the minutia of the captured fingerprint in each minutia matching pair in the image may include: acquiring a fingerprint direction graph of the captured fingerprint and determining a direction of the block based on the acquired fingerprint direction graph, wherein the direction of the block is a direction of a position where the minutia is located in the fingerprint direction graph.

The determining for each minutia in the minutia matching pairs, whether the minutia surrounding features of the captured fingerprint match with pre-stored minutia surrounding features of the reference fingerprint to obtain a second matching result may include performing at least one of the following operations: for each minutia matching pair, checking whether the fingerprint direction strength information of the periphery of the minutia matching pair matches or not and obtaining the second matching result based on the fingerprint direction strength information according to the matching; for each minutia matching pair, checking whether the binary pixel information of the periphery of the minutia matching pair matches or not and obtaining the second matching result based on the binary pixel information according to the matching; and for each minutia matching pair, checking whether the gray information of the periphery of the minutia matching pair matches or not and obtaining the second matching result based on the gray information according to the matching.

The minutia surrounding features may further include information about at least one of following items: a ridge point of a ridge line where the minutia is located, the number of ridge lines between the minutia and a neighbor minutia, and the number of the neighbor minutiae of the minutia in a maximum common area that the corresponding minutia matching pair has.

The determining for each minutia in the minutia matching pairs, whether the minutia surrounding features of the captured fingerprint match with pre-stored minutia surrounding features of the reference fingerprint to obtain a second matching result may further include performing at least one of following operations: for each minutia matching pair, checking whether the ridge points of the ridge lines where the minutia matching pair is located match or not and obtaining the second matching result based on the ridge point according to the matching; for each two minutia matching pairs, checking whether the numbers of ridge lines corresponding thereto are similar or not and obtaining the second matching result based on the numbers of ridge lines according to a similarity degree; and for each minutia matching pair, checking whether the numbers of the neighbor minutiae in the maximum common area that the minutia matching pair has are similar or not and obtaining the second matching result based on the numbers of the neighbor minutiae according to the similarity degree.

The determining an identification result of the captured fingerprint according to the second matching result and the first matching result may include: if the matching of the minutia surrounding features succeeds, increasing a value of the first matching result; and if the matching of the minutia surrounding features fails, decreasing a value of the first matching result, wherein a degree of adjustment to the first matching result is associated with a value of the second matching result.

An electronic apparatus according to embodiments of the present disclosure includes at least one processor; and at least one memory which stores computer executable instructions, wherein the computer executable instructions, when being executed by the at least one processor, cause the at least one processor to execute the above said fingerprint identification method.

According to embodiments of the present disclosure, a computer readable storage medium storing instructions, which, when being run by at least one processor, causes the at least one processor to execute the fingerprint identification method as said above is provided.

It should be understood that the above general description and the following detailed description are explanatory and do not limit the present disclosure.

BRIEF DESCRIPTION OF THE DRAWINGS

The drawings herein are incorporated into the description and form a part of the description, and show embodiments consistent with the present disclosure. The drawings are to be used together with the description to explain the principles of the present disclosure, and do not constitute an improper limitation of the present disclosure.

FIG. 3 illustrates that gray information of the periphery of the matched successfully minutia pairs of different fingers in FIG. 2 are not similar;

FIG. 4 illustrates that binary information of the periphery of the matched successfully minutia pairs of different fingers in FIG. 2 are not similar;

FIG. 6 illustrates that binary information of the periphery of the matched successfully minutia pairs of identical fingers in FIG. 5 are similar;

FIG. 7 illustrates that gray information of the periphery of the matched successfully minutia pairs of identical fingers in FIG. 5 are similar;

DETAILED DESCRIPTION OF THE EMBODIMENTS

In order to enable those ordinary skilled in the art to better understand the present disclosure, embodiments of the present disclosure will be clearly and completely described below in conjunction with the accompanying drawings.

The terms "first", "second" and the like in the description and claims as well as the above drawings of the present disclosure are used to distinguish similar objects and are not necessarily used to describe a specific sequence or an order. It should be understood that these objects may be interchangeable where appropriate so that the embodiments of the present disclosure described herein can be implemented in an order other than those illustrated or described herein. The embodiments described in the following embodiments do not represent all embodiments consistent with the present disclosure. Instead, they are only examples of apparatuses and methods consistent with some aspects of the present disclosure and within the scope of the appended claims.

It should be noted here that "at least one of several items" appearing in the present disclosure refers to three juxtaposition cases including "any one of the several items", "any combination of multiple items among the several items", and "all of the several items". For example, "including at least one of A and B" includes the following three juxtaposition cases: (1) including A; (2) including B; and (3) including A and B. For another example, "performing at least one of step 1 and step 2" represents the following three juxtaposition cases: (1) performing step 1; (2) performing step 2; and (3) performing steps 1 and 2. Similarly, "or" may include the "and/or" case unless indicated otherwise by context.

Figure 1:
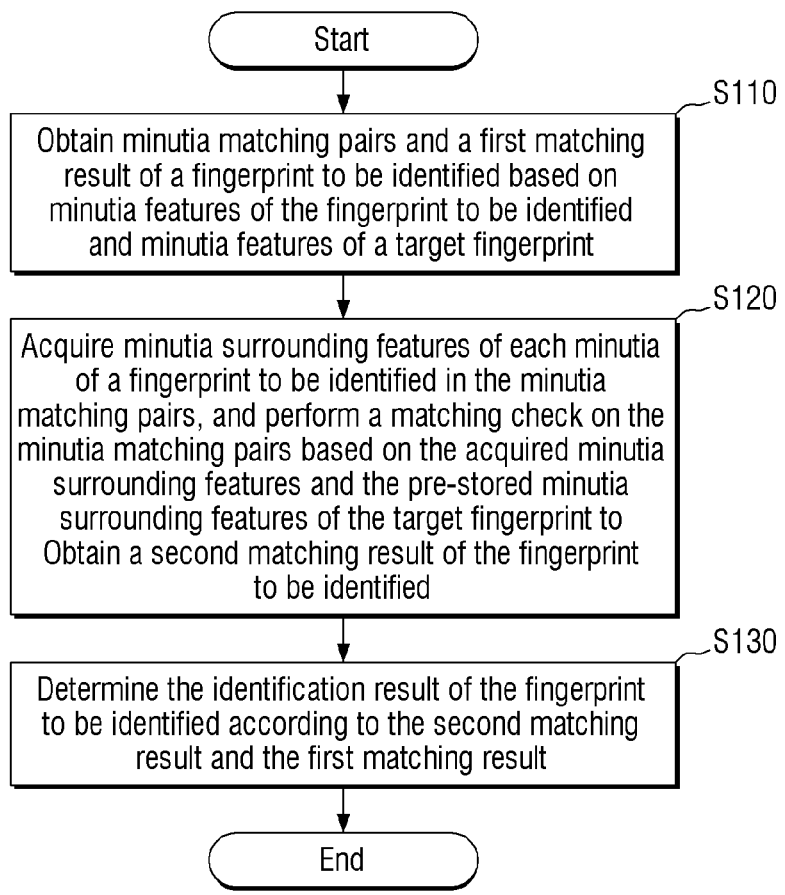
FIG. 1 is a flow diagram of a fingerprint identification method in accordance with embodiments of the present disclosure.

FIG. 1 is a flow diagram of a fingerprint identification method in accordance with embodiments of the present disclosure.

Referring to FIG. 1, at step S110, minutia matching pairs and a first matching result of a fingerprint to be identified are obtained based on minutia features of the fingerprint to be identified and minutia features of a target fingerprint. The target fingerprint may be a previously recorded fingerprint, e.g., a reference fingerprint. The fingerprint to be identified may be referred to as the captured fingerprint.

For example, the minutia features of the fingerprint to be identified may be obtained by acquiring an image of the fingerprint to be identified and performing feature extraction on the image. For example, a fingerprint sensor may be used to acquire the image of the fingerprint to be identified in real time, but the present disclosure is not limited thereto. For example, a pre-stored image of the fingerprint to be identified may also be acquired from a predetermined storage position.

The minutia features of the fingerprint to be identified may be extracted by any existing fingerprint minutia feature extraction method, and accordingly the minutia feature extraction is not limited by the present disclosure. The target fingerprint may be a previously recorded fingerprint, and the minutia features of the target fingerprint may be previously obtained by performing feature extraction on the image of the target fingerprint, and also may be pre-stored. Therefore, the minutia features of the target fingerprint may be directly acquired from a predetermined storage position. After obtaining the minutia features of the fingerprint to be identified and the minutia features of the target fingerprint, the minutia features of the fingerprint to be identified and the minutia features of the target fingerprint may be matched to obtain 1) minutia matching pairs and 2) a first matching result of the fingerprint to be identified based on the minutia matching pairs. Any existing minutia feature matching method may be used to perform minutia feature matching, which is not limited by the present disclosure.

As an example, the obtaining of minutia matching pairs and a first matching result of a fingerprint to be identified, based on minutia features of the fingerprint to be identified and minutia features of a target fingerprint may include: acquiring the minutia features of the fingerprint to be identified and pre-stored minutia features of the target fingerprint; matching the acquired minutia features of the fingerprint to be identified and the minutia features of the target fingerprint to obtain minutia matching pairs; and obtaining a first matching result of the fingerprint to be identified according to the minutia matching pairs. As an example, the first matching result may be a matching score obtained based on the minutia feature matching.

As an example, the matching score MMS obtained based on the minutia feature matching may be expressed as follows:

$$MMS = \frac{n^2}{|P||Q|}$$

wherein, n is the number of the minutia matching pairs, P is the number of minutiae of the fingerprint to be identified, and Q is the number of minutiae of the target fingerprint.

Next, at step S120, minutia surrounding features are acquired for each minutia of the fingerprint to be identified in the minutia matching pairs, and a matching check is performed on the minutia matching pairs based on the acquired minutia surrounding features and the pre-stored minutia surrounding features of the target fingerprint to obtain a second matching result of the fingerprint to be identified.

According to embodiments, the minutia surrounding features may include: fingerprint direction strength information, binary pixel information, and/or gray information of the periphery of the minutia. The above information may be referred to as "minutia surrounding information" hereinafter. In addition, fingerprint direction strength information, binary pixel information and gray information may be fingerprint direction strength information, binary pixel information and gray information within a certain region of the periphery of the minutia.

For example, step S130 may include following operations: first, extracting minutia surrounding features of the minutia of the fingerprint to be identified in each minutia matching pair based on an image of the fingerprint to be identified; acquiring pre-stored minutia surrounding features of the minutiae of the target fingerprint; for each minutia matching pair, matching the minutia surrounding features of the minutiae of the fingerprint to be identified in the minutia matching pair with the minutia surrounding features of the target fingerprint and obtaining the second matching result based on the results of the matching of the minutia surrounding features.

For example, minutia surrounding features of the minutia of the fingerprint to be identified in each minutia matching pair are extracted based on the image of the fingerprint to be identified. As mentioned above, each minutia matching pair is obtained by performing the minutia feature matching on the fingerprint to be identified and the target fingerprint. Therefore, each minutia matching pair has a minutia in both the fingerprint to be identified and the target fingerprint. Since a fingerprint feature template of the target fingerprint may be established in advance, and the fingerprint feature template may include minutia surrounding features of the minutia of the target fingerprint, at step S120, it is only necessary to extract minutia surrounding features of the minutia of the fingerprint to be identified in each minutia matching pair during the fingerprint identification method. The minutia surrounding features of the minutia of the target fingerprint in each minutia matching pair may be obtained by acquiring a pre-stored fingerprint feature template of the target fingerprint. In addition, when the fingerprint feature template of the target fingerprint is established in advance, the method of extracting minutia surrounding features of the minutia of the target fingerprint is the same as that of extracting minutia surrounding features of the minutia of the fingerprint to be identified in each minutia matching pair.

For example, when minutia surrounding features of the minutia of the fingerprint to be identified in each minutia matching pair are extracted based on the image of the fingerprint to be identified, first, a block with a predetermined size centered on the minutia of the fingerprint to be identified in each minutia matching pair is determined in the image; then, at least one operation of the following operations may be performed: calculating a gradient in the block and acquiring, based on the calculated gradient, fingerprint direction strength in the block as the fingerprint direction strength information; acquiring binary information of each pixel in the block as the binary pixel information; and calculating a gray mean value and gray variance in the block as the gray information.

For example, in order to determine the block, a fingerprint direction graph of the fingerprint to be identified may be acquired, and a direction of the block is determined based on the acquired fingerprint direction graph, wherein the direction of the block is a direction of a position where the minutia is located in the fingerprint direction graph. For example, the direction of the block may be a common direction between the fingerprint to be identified and the target fingerprint such that the minutiae are oriented similarly. It should be noted that the size of the block may be predefined. For example, the size of the block is determined as a block with size N*N, where N is a positive integer. Further, the size of the block may be a number of pixels included in the block. In some embodiments, the block may be a rectangle of size N*M, or a circle, or another shape. Since in the subsequent minutia surrounding feature matching, it is necessary to ensure that the extracted minutia surrounding features are based on aligned blocks, here, when the block is determined, it is necessary to determine the direction of the block. As described above, the direction of the block may be determined by means of the fingerprint direction graph. For example, the direction of the block may be determined as the direction of the position where the minutia is located in the fingerprint direction graph. Minutia feature extraction algorithms of a fingerprint all include a step of direction graph extraction. Therefore, we only need to use the fingerprint direction graph extracted during the minutia feature extraction.

Next, how to extract the above minutia surrounding features is introduced. For example, the fingerprint direction strength information may be obtained, for example, by: calculating the gradient of the fingerprint in the block by, for example, calculating a gradient field of the fingerprint in the block based on the gray image of the fingerprint to be identified (the gradient reflects the steepest degree of the fingerprint lines), and subsequently acquiring the fingerprint direction strength in the block based on the calculated gradient as the fingerprint direction strength information. For example, the fingerprint direction field in the block is obtained based on the calculated gradient field, as the fingerprint direction strength information.

In addition, binary pixel information may be acquired by, for example: in a image of the fingerprint to be identified, acquiring the binary information 0 or 1 of each pixel pixel by pixel from the upper left corner of the block with size N*N, and storing the binary information of the block as the binary pixel information using a variable with a size of N*N. For example, if N=8, a long variable of 64 bits may be used to store the binary information of the block. If the block with size N*N exceeds an effective area of the fingerprint to be identified, the binary information outside of the effective area may be assigned to 0.

The gray information may be acquired by, for example: calculating a mean value and variance of the gray level of the pixels in the block with size N*N based on a gray level image of the fingerprint to be identified as the gray information. However, it should be noted that the gray information is not limited to the mean value and variance of a gray level, but may be any statistical information of the gray level in the block.

The preceding examples illustrate how to acquire minutia surrounding features of each minutia in the minutia matching pair. After acquiring minutia surrounding features of the minutia of the fingerprint to be identified in each minutia matching pair and acquiring minutia surrounding features of the pre-stored minutia of the target fingerprint, for each minutia matching pair, the minutia surrounding features of the minutia of the fingerprint to be identified in the minutia matching pair may be matched with the minutia surrounding features of the target fingerprint, and the second matching result is obtained according to these matching results.

For example, one or more operations may be performed to determine the second matching result. One operation includes, for each minutia matching pair, checking whether or not the fingerprint direction strength information of the periphery of the minutia matching pair matches, and obtaining the second matching result based on the fingerprint direction strength information according to the direction strength matching result. Another operation includes, for each minutia matching pair, checking whether or not the binary pixel information of the periphery of the minutia matching pair matches and obtaining the second matching result based on the binary pixel information matching. Another operation includes, for each minutia matching pair, checking whether or not the gray information of the periphery of the minutia matching pair matches and obtaining the second matching result based on the gray information matching. Any combination of these operations may be performed to determine the second matching result.

The operations of the above operations that are specifically performed depends on which features are included in the previously extracted minutia surrounding features. For example, if the previously extracted minutia surrounding features only include binary pixel information, then only the matching of binary pixel information is performed to determine the second matching result. If the previously extracted minutia surrounding features include binary pixel information and fingerprint direction strength information, then the matching of binary pixel information and the matching of fingerprint direction strength information are performed. If the extracted minutia surrounding features include all of: the fingerprint direction strength information, binary pixel information, and gray information of the periphery of the minutia, then the matching will be based on all of the above three information, and the previously obtained first matching result is adjusted based on the three matching results, and the final matching result will be more accurate.

Below the matching method based on fingerprint direction strength information, the matching method based on binary pixel information, and the matching method based on gray information are described.

Regarding the matching method of binary pixel information, since the sizes and directions of the blocks for determining minutia surrounding features are the same, that is, the blocks are aligned, it is only necessary to successively compare whether the binary information of each pixel in the block determined in the image of the fingerprint to be identified matches the binary information of each pixel in the block of the same size and direction determined in the target fingerprint. Since binary information is matched bit-by-bit with an exclusive OR, a mismatch is counted when the exclusive OR outputs a value of 1. The number of mismatches in all binary pixels is counted, and the second matching result based on the binary pixel information is obtained (for example, the matching score based on the binary pixel information is obtained) according to the percentage of the number of mismatches. As described above, if the block of size N*N exceeds the effective area of the fingerprint to be identified, the binary information of the exceeded part may be assigned with 0. Therefore, when matching the binary pixel information, if the binary information is 0, that is, the block exceeds the effective area of the fingerprint, then such a matching check of the surrounding information is not performed, and the matching score remains unchanged.

The matching method of the fingerprint direction strength information may compare whether the block determined in the image of the fingerprint to be identified matches the fingerprint direction strength of the block of the same size and direction determined in the target fingerprint. For example, the fingerprint direction strength in of the image of the fingerprint to be identified may be subtracted from the fingerprint direction strength in the block determined in the target fingerprint. The absolute value of this subtraction result may determine the second matching result. For example, the matching score based on the fingerprint direction strength information is determined according to the absolute value.

The matching method of the gray information may include comparing whether the block determined in the image of the fingerprint to be identified matches the gray information of the block of the same size and direction determined in the target fingerprint. For example, the block determined in the image of the fingerprint to be identified may be compared with the block determined in the target fingerprint in the gray mean value and in the variance, to determine whether the gray mean values match and whether the variances match. For example, the absolute value of a subtraction of the gray mean values in each block is obtained, and the absolute value of a subtraction of the variances in each block is obtained, and the second matching result based on the gray information is determined according to the absolute value, for example, the matching score based on the gray information is determined according to the absolute value.

Finally, the matching score $S_{MAI}$ obtained through the matching check based on the minutia surrounding information (fingerprint direction strength information, binary pixel information and gray information) may be expressed as follows:

$$S_{MAI}=\Sigma_{i=0}^{n}(\text{Diff}(P_{BPIi},Q_{BPIi})+(P_{OCLi}-Q_{OCLi})+(P_{GSDi}-Q_{GSDi})$$

wherein $P_{BPIi}$ and $Q_{BPIi}$ are binary pixel information of the periphery of the i-th minutia matching pair, respectively, $\text{Diff}(P_{BpIi}, Q_{BPIi})$ is a difference between $P_{BPIi}$ and $Q_{BPIi}$, $P_{OCLi}$ and $Q_{OCLi}$ are gray information of the periphery of the i-th minutia matching pair, respectively, and $P_{GSDi}$ and $Q_{GSDi}$ are fingerprint direction strength information of the periphery of the i-th minutia matching pair, respectively.

The matching check is performed on the minutia matching pair based on the minutia surrounding features because minutia feature matching may not accurate enough alone. If the matching result based on the minutia feature matching is directly used as the final matching result to determine the identification result of the fingerprint to be identified, there is increased risk to cause an inaccurate fingerprint identification. For example, different fingers may be recognized as the same fingers, which causes an incorrect result in which the fingerprint verification has passed. Or, the same finger is recognized as a different finger, which causes an incorrect result in which the fingerprint verification has not passed.

Figure 2:
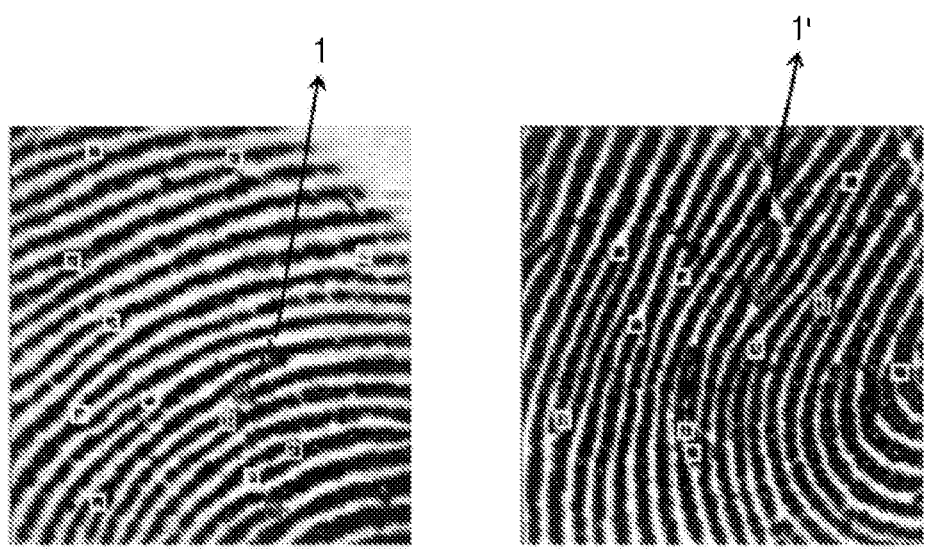
FIG. 2 is an example of false fingerprint verification pass of different fingers with a minutia matching score higher than a threshold.

FIG. 2 is an example of false fingerprint verification pass based on the minutia feature matching, where two different fingers achieve a matching score higher than a threshold. In FIG. 2, because there are 5 successfully matched minutia matching pairs in the fingerprint to be identified and the target fingerprint, they are considered to be from the same finger. However, in fact, the left fingerprint and the right fingerprint in FIG. 2 come from different fingers, but since their matching score based on the minutia feature matching is higher than the threshold, they are considered to be the same finger and are determined to pass the fingerprint verification.

Figure 3:
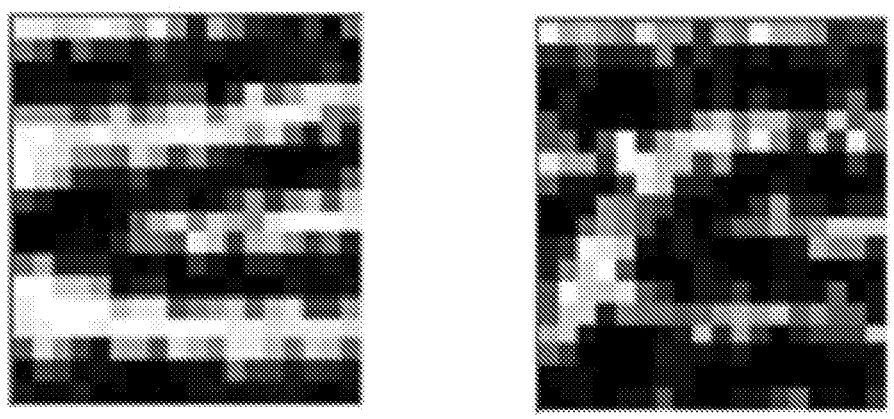
Figure 4:
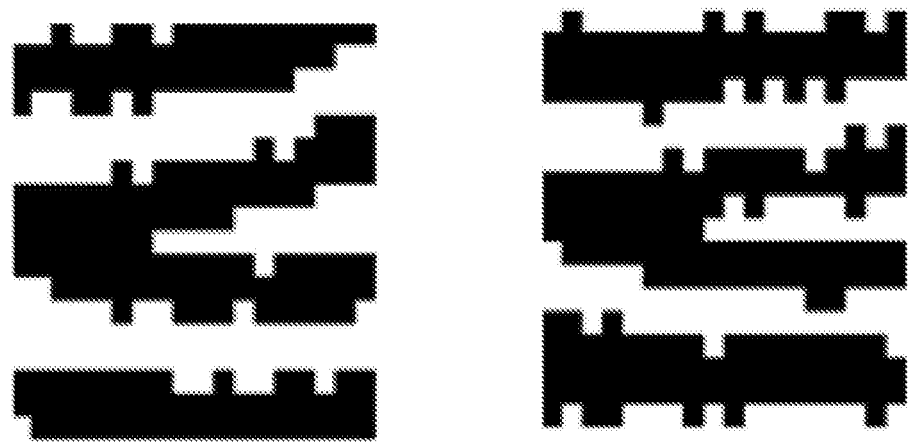

However, the minutia surrounding features of the two fingers do not match. This may be found through a surrounding features matching check of the successfully matched minutia matching pairs. For example, for the minutia matching pair 1 and 1' successfully matched in FIG. 2, FIG. 3 shows surrounding gray information thereof, for example, a surrounding gray level image. It may be intuitively seen from FIG. 3 that the surrounding gray information of the minutia pair 1 and 1' in FIG. 2 are not similar. In addition, for the minutia matching pair 1 and 1' successfully matched in FIG. 2, FIG. 4 shows surrounding binary information thereof. It may be seen intuitively from FIG. 4 that the surrounding binary information of the minutia pair 1 and 1' in FIG. 2 are not similar. Accordingly, by incorporating the gray information and the binary information in this case, the two different fingers may not result in a false positive verification.

Figure 5:
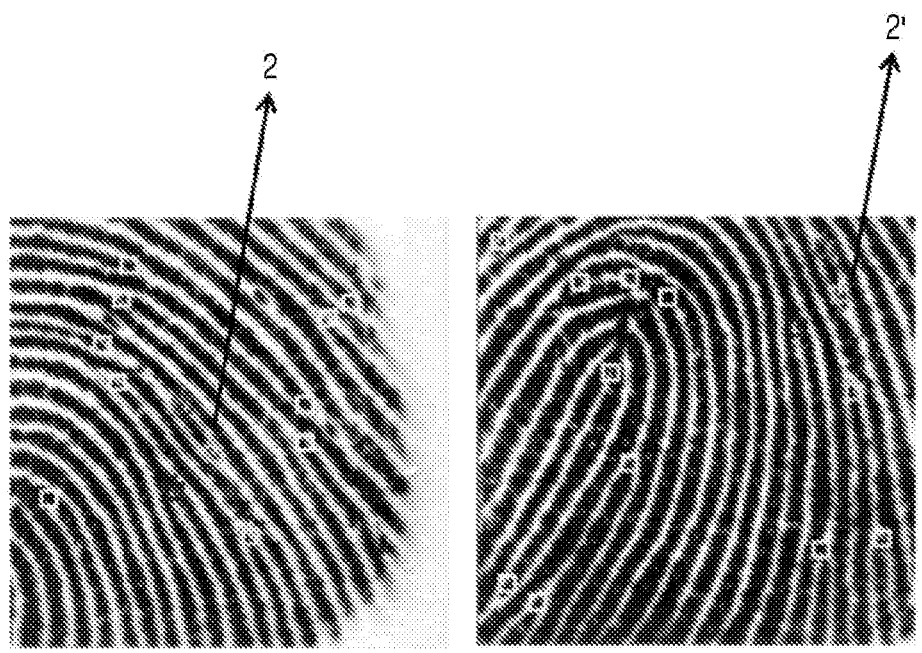
FIG. 5 illustrates an example of false fingerprint verification failure of identical fingers with a minutia matching score lower than a threshold.
Figure 6:
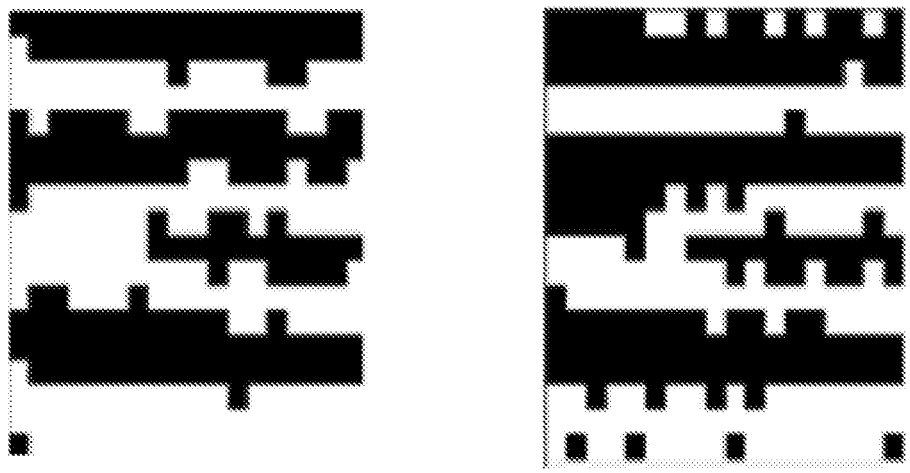
Figure 7:
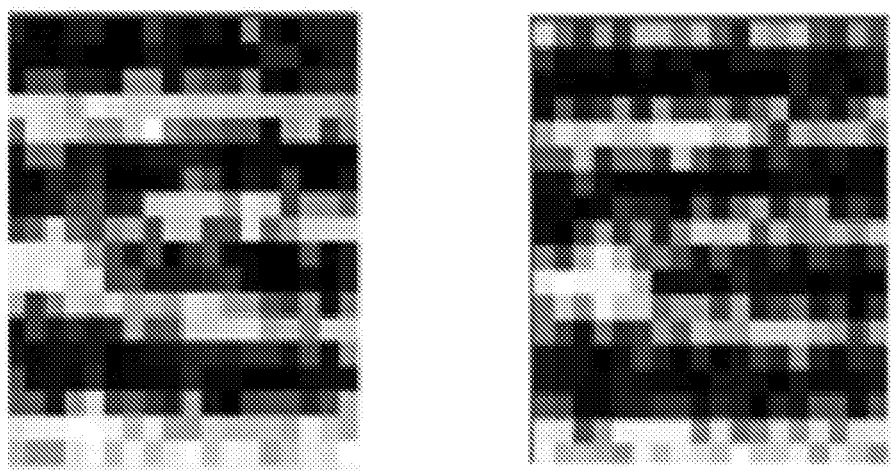

FIG. 5 illustrates an example of a false fingerprint verification failure of identical fingers with a minutia matching score lower than a threshold. The two images in FIG. 5 are fingerprints from the same finger. However, since they are partial fingerprints with a small overlapping area, only four minutiae are matched in the overlapping area, and they are considered to be from different fingers. In this case, the fingerprint verification incorrectly fails. However, it may be found that the minutia surrounding features thereof are similar through the matching check of the successfully matched minutia matching pairs. For example, for the minutia matching pair 2 and 2' successfully matched in FIG. 5, FIG. 6 shows surrounding binary information thereof. It may be seen intuitively from FIG. 6 that the surrounding binary information of the minutia pair 2 and 2' in FIG. 5 are similar. FIG. 7 illustrates surrounding gray information of the minutia matching pair 2 and 2', for example, a surrounding gray level image. It may be intuitively seen from FIG. 7 that the surrounding gray information of the minutia pair 2 and 2' in FIG. 5 are similar A more accurate fingerprint recognition result may be obtained according to both of the matching result of the minutia surrounding features and the matching result based on the minutia features. For example, by incorporating the gray information and the binary information in this case, two images from the same finger may not result in a false negative verification.

In at least one embodiment of the present disclosure, the minutia surrounding features may further include information about at least one of following items: a ridge point of a ridge line where the minutia is located, the number of ridge lines between the minutia and a neighbor minutia, and the number of neighbor minutiae of the minutia in a maximum common area that the corresponding minutia matching pair has. In this case, the matching of the minutia surrounding features of the minutia of the fingerprint to be identified in the minutia matching pair with the minutia surrounding features of the target fingerprint and the obtaining of the second matching result according this matching may further include performing one or more following operations. One following operation includes, for each minutia matching pair, checking whether or not the ridge points of the ridge lines where the minutia matching pair is located match, and obtaining the second matching result based on the ridge point according to the matching. Another operation includes, for each two minutia matching pairs, checking whether or not the numbers of ridge lines corresponding thereto are similar, and obtaining the second matching result based on the numbers of ridge lines according to a similarity degree (e.g., a similarity threshold). Yet another operation includes, for each minutia matching pair, checking whether or not the numbers of the neighbor minutiae in the maximum common area that the minutia matching pair has are similar, and obtaining the second matching result based on the numbers of the neighbor minutiae according to the similarity degree.

As an example, checking whether or not the ridge line points of the ridge lines where the minutia matching pairs are located match may include: checking whether or not coordinates and/or direction angles of the ridge line points of the ridge lines where the minutiae are located match. The matching score based on the ridge line points may be obtained according to whether or not coordinates and/or direction angles match.

As an example, the matching of the number of ridge lines may include: checking, for each two successfully matched pairs of minutiae, whether the numbers of corresponding ridge lines thereof are similar. The two pairs of successfully matched minutiae may be searched based on the minutia coordinate positions to determine whether they are the same corresponding pairs across each fingerprint image. After the corresponding two pairs of successfully matched minutiae are confirmed, the numbers of corresponding ridge lines are compared to obtain the matching score. For example, the matching score $S_{RC}$ obtained by the matching check based on the number of ridge lines may be expressed as:

$$S_{RC} = \sum_{i=0}^{n} \begin{cases} T_{RC}, \text{ if } |P_{RCi} - Q_{RCi}| \geq T_{RC} \\ |P_{RCi} - Q_{RCi}|, \text{ else} \end{cases}$$

wherein $P_{RCi}$ and $Q_{RCi}$ are the numbers of corresponding ridge lines in the fingerprint to be identified and the target fingerprint in the i-th minutia matching pair, respectively, and n is the number of minutia matching pairs, and $T_{RC}$ is a predefined value.

Figure 8:
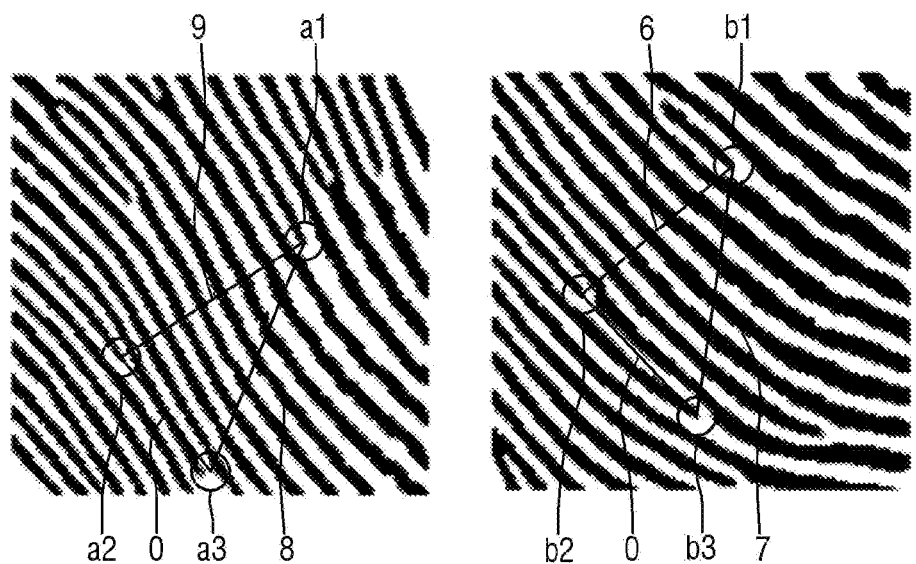
FIG. 8 is a matching check based on a feature of the number of ridge lines in accordance with embodiments of the present disclosure.

FIG. 8 is a matching check based on a feature of the number of ridge lines in accordance with embodiments of the present disclosure. FIG. 8 includes binary images of two fingerprint images that are used in performing the matching. After the minutia feature matching, it has been found that a1 matches b1, a2 matches b2, and a3 matches b3. The matching check shown in FIG. 8 is to check whether the numbers of ridge lines between two minutiae in two pairs of matched minutiae are similar, for example, to check whether the number of ridge lines between a1 and a2 is similar to that between b1 and b2, whether the number of ridge lines between a1 and a3 is similar to that between b1 and b3, and whether the number of ridge lines between a2 and a3 is similar to that between b2 and b3, finally, the matching score based on the number of ridge lines is obtained according to a similarity degree.

As an example, the matching check based on the number of neighbor minutiae may include: checking, for each pair of successfully matched minutiae, whether the number of minutiae in their common area are similar. The matching check first needs to find the common area. Examples of finding the common area include finding the maximum common area that the two minutiae have based on a square, a circle, or another shape, further based on the position of the minutiae in the fingerprint image. Then the number of minutiae in the common area is counted. Finally, the matching score based on the number of neighbor minutiae is obtained by comparing the number of minutiae.

For example, the matching score $S_{NMC}$ obtained by the matching check based on the number of the neighbor minutiae may be expressed as:

$$S_{NMC} = \sum_{i=0}^{n} \begin{cases} T_{NMC}, \text{ if } |P_{NMCi} - Q_{MNCi}| \geq T_{NMC} \\ |P_{NMCi} - Q_{NMCi}|, \text{ else} \end{cases}$$

wherein $P_{NMCi}$ and $Q_{NMCi}$ are the numbers of the neighbor minutiae in the maximum common area that the i-th minutiae matching pair has in the fingerprint to be identified and in the target fingerprint, respectively, n is the number of the minutia matching pairs, and $T_{NMC}$ is a predefined value (e.g., a threshold value).

Figure 9:
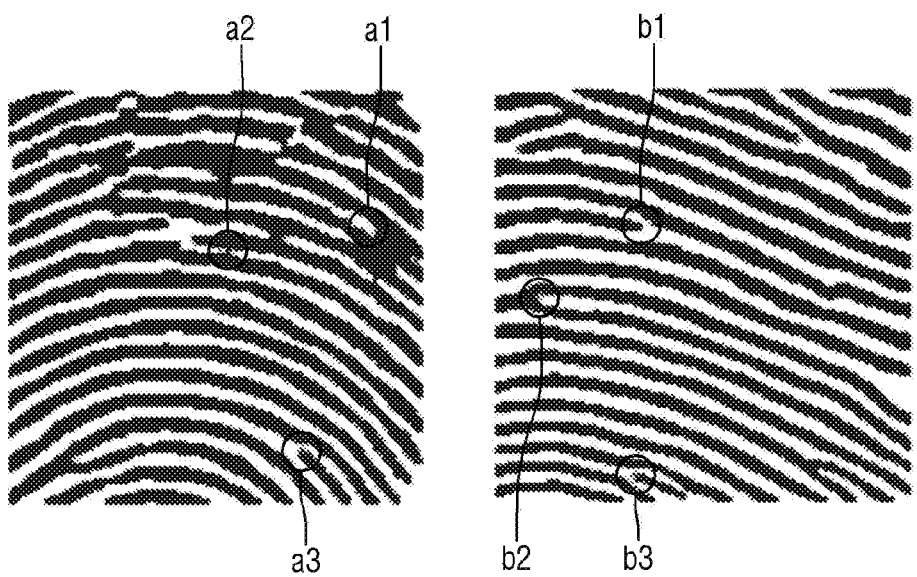
FIG. 9 is a matching check based on a feature of the number of neighbor minutiae in accordance with embodiments of the present disclosure.

FIG. 9 depicts a matching check based on a feature of the number of neighbor minutiae in accordance with embodiments of the present disclosure. FIG. 9 is an illustrative diagram of checking whether the numbers of neighbor minutiae of the matched minutia matching pair within the maximum common area thereof are similar. FIG. 9 is a binary image of two fingerprints that are matched. In this example, after the minutia matching, it's determined that a1 matches b1, a2 matches b2, and a3 matches b3. The matching check based on the number of neighbor minutiae is to check whether the numbers of neighbor minutiae of the matched minutia matching pair within the maximum common area thereof are similar. Taking a1 and b1 as an example, first, the maximum common area of a1 and b1 is obtained, and a circular region (the radius of the circular region may be the minimum distance of the distance from a1 to the four sides of the fingerprint image where a1 is located and the distance from b1 to the four sides of the fingerprint image where b1 is located) may be used, then the number of neighbor minutiae in respective region is counted, and the matching score based on the number of neighbor minutiae is obtained according to the similarity degree of the number of neighbor minutiae.

Referring back to FIG. 1, after the second matching result is obtained, at step S130, the identification result of the fingerprint to be identified may be determined according to the second matching result and the first matching result. For example, the first matching result may be adjusted according to the second matching result to obtain the final matching result, and the identification result of the fingerprint is determined according to the final matching result. For example, if the matching of the minutia surrounding features succeeds, the value of the first matching result is increased, and if the matching of the minutia surrounding features fails, the value of the first matching result is reduced. Here, the degree of adjustment to the first matching result is associated with a value of the second matching result.

For example, for the example of false verification pass from FIG. 2, if the matching check of the minutia surrounding information is added, the matching score based on the minutia feature matching will be reduced. Finally, the false verification pass of the pair of different fingers may be corrected to be a correct verification failure. In addition, for the example of false fingerprint verification failure in FIG. 5, if the matching check of the minutia surrounding information is added, the matching score based on the minutia feature matching will be increased. Finally, the false verification failure of the pair of same finger may be corrected to be a correct verification pass.

For example, adjusting the first matching result according to the second matching result to obtain the final matching result may include adjusting the matching score MMS obtained based on the minutia feature matching to obtain the final matching result EMMS by the following formula:

$$EMMS = \frac{(n + \alpha[S_{MAI}] * S_{MAI} + \beta[S_{NMC}] * S_{NMC} + \gamma[S_{RC}] * S_{RC})^2}{|P||Q|}$$

where n is the number of the minutia matching pairs, P is the number of the minutiae of the fingerprint to be identified, and Q is the number of the minutiae of the target fingerprint. $\alpha[S_{MAI}]$, $\beta[S_{NMC}]$, $\gamma[S_{RC}]$ are weights of $S_{MAI}$, $S_{NMC}$ and $S_RC$, respectively, the values of these weights may be obtained through training and may also be set according to experience and the values of the weights will vary based on the varying of scores $S_{MAI}$, $S_{NMC}$ and $S_RC$.

For example, in the case of the values of these weights being determined by training, the method and apparatus described herein for fingerprint identification may include a machine learning component. The machine learning component may include a model that is developed through a supervised learning process. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Finally, after obtaining the final matching result, the identification result of the fingerprint to be identified may be determined according to the final matching result. For example, in the case where the final matching result meets a predetermined condition, the identification result of the fingerprint to be identified is determined to be a fingerprint verification pass. Otherwise, the identification result of the fingerprint to be identified is determined to be a fingerprint verification failure. For example, if the final matching result EMMS is greater than a preset threshold, it is considered to be the fingerprints of the same finger, and the fingerprint identification result is the fingerprint verification pass. Otherwise, it is considered to be the fingerprints of different fingers, and the fingerprint identification result is the verification failure.

Above, a fingerprint identification method according to embodiments of the present disclosure has been described with reference to FIGS. 1 to 9, according to which a more accurate fingerprint identification result than comparative examples may be provided. Hereinafter, in order to more clearly comprehend the fingerprint identification method according to embodiments of the present disclosure, the processes and components thereof will be briefly described below again in conjunction with the examples of FIGS. 10 and 12.

Figure 10:
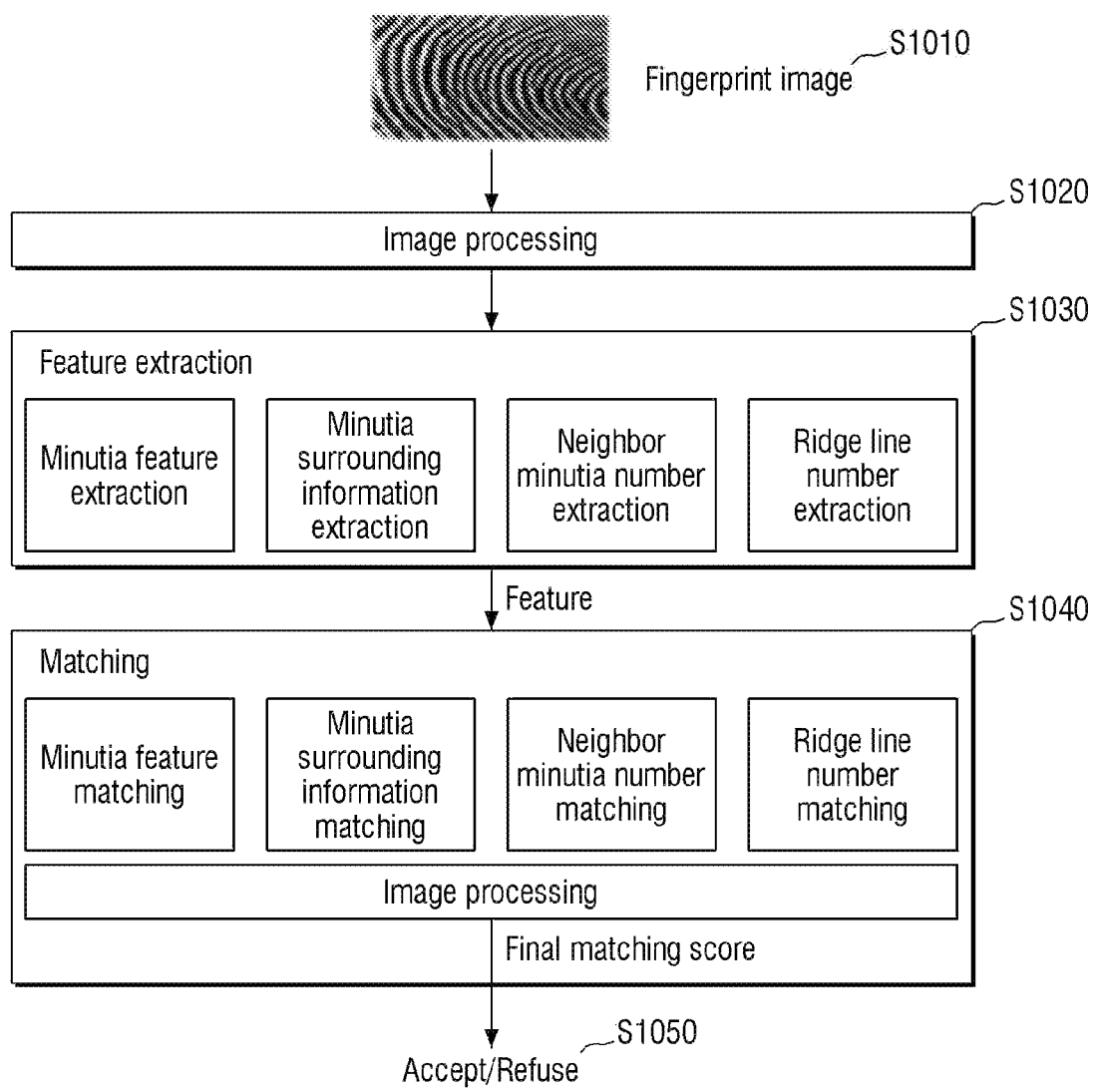
FIG. 10 is a diagram of an example of a fingerprint identification method in accordance with embodiments of the present disclosure.
Figure 11:
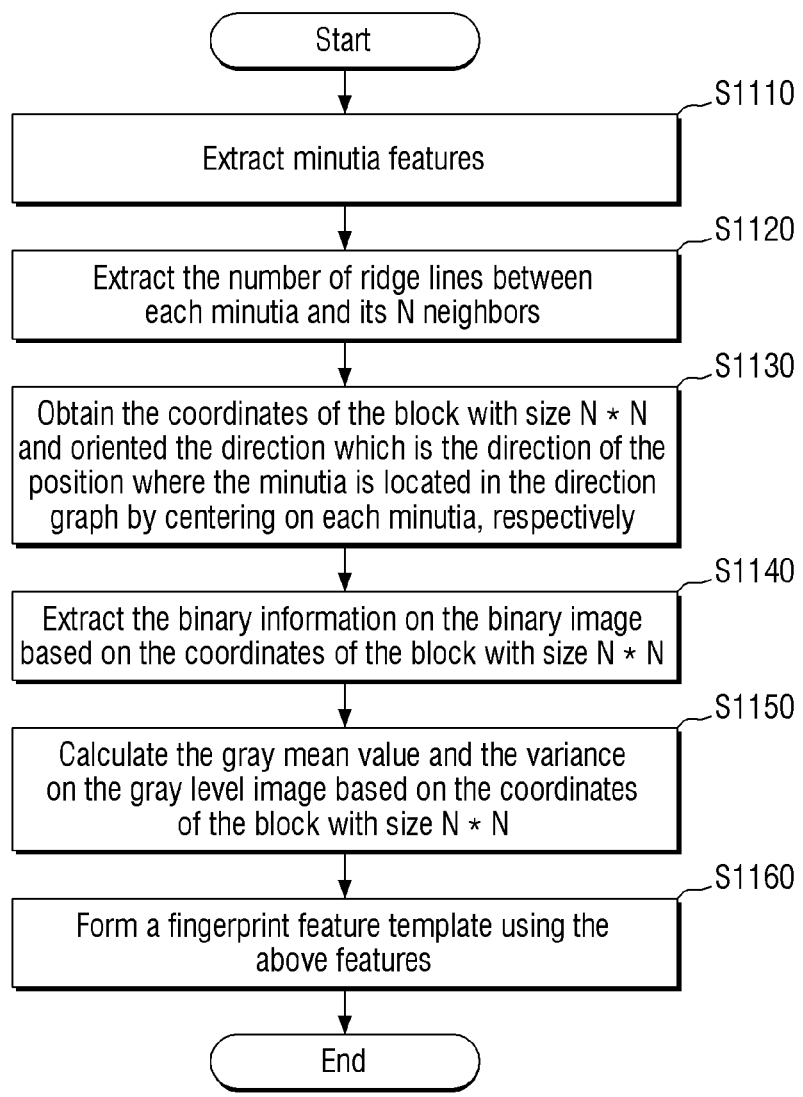
FIG. 11 is flow diagram of a method for generating a fingerprint feature template in accordance with embodiments of the present disclosure.
Figure 12:
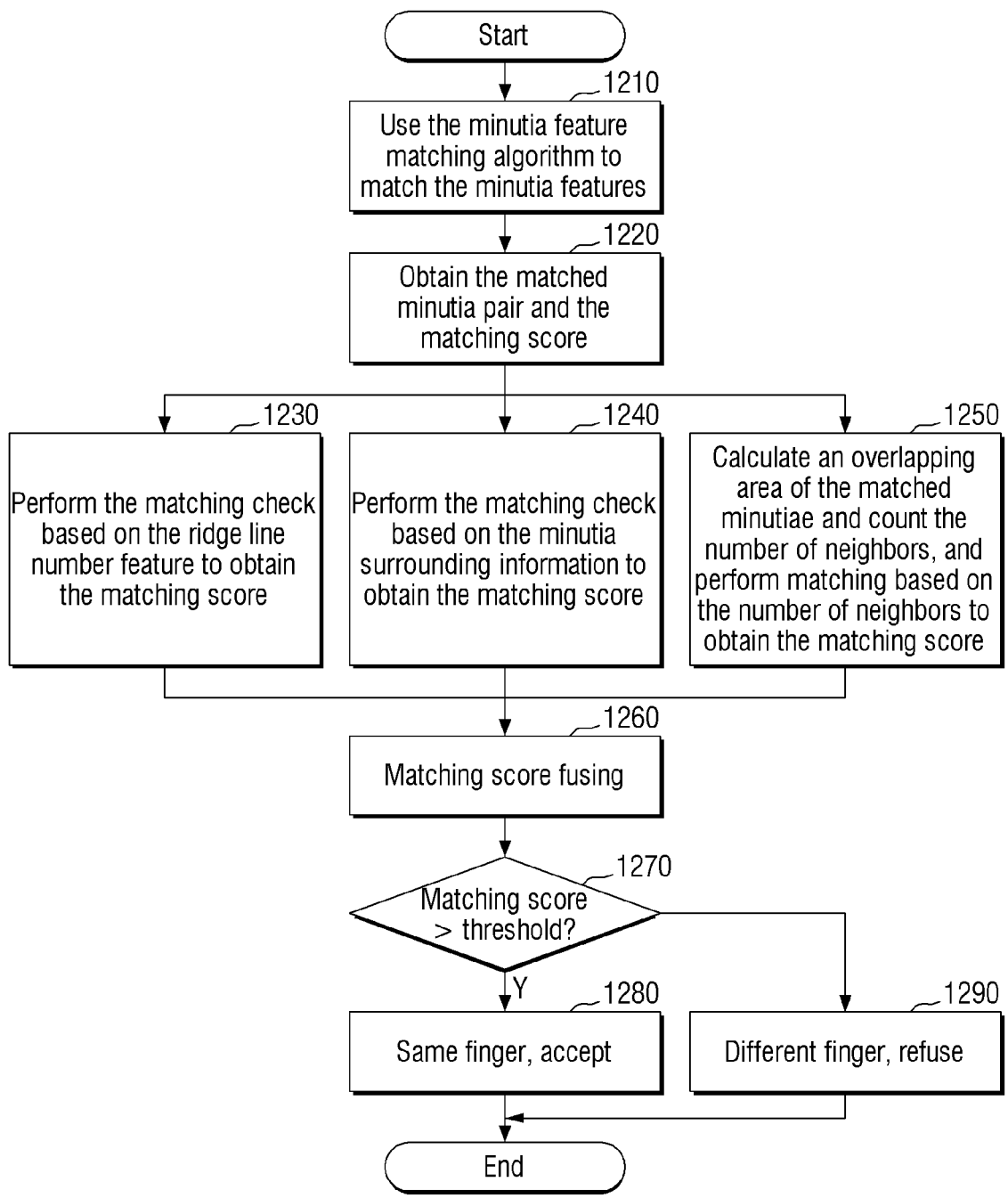
FIG. 12 is a flow diagram of an example of the fingerprint identification method in accordance with embodiments of the present disclosure.

In the examples of FIGS. 10 to 12, it is assumed that the minutia surrounding features include minutia surrounding information, the number of ridge lines, and the number of neighbor minutiae. However, embodiments that are also in accordance with FIGS. 10 to 12 may incorporate additional or alternative minutia surrounding features.

As illustrated in FIG. 10, after the fingerprint image of the fingerprint to be identified is acquired (e.g., at step 1010), feature extraction may be performed based on the fingerprint image (e.g., step 1020). Processing may be performed on the fingerprint image before or after the feature extraction. Performing minutia feature extraction (e.g., step 1030) may include minutia surrounding information extraction, ridge line number extraction and neighbor minutia number extraction. Next, the minutia feature matching may be performed to obtain the matching score (e.g., step 1040), and for the successfully matched minutia matching pairs, the matching check may be performed by performing minutia surrounding information matching, ridge line number matching, and neighbor minutia number matching, so as to obtain their respective matching scores. Then, the final matching score may be determined by fusing the matching scores. Here, the process of fusing the matching scores is the process of adjusting the matching score obtained based on the minutia feature matching according to the matching score obtained by the matching check. For example, the fusing of the matching scores may be in accordance with the above equation for EMMS. Finally, whether the fingerprint verification passes (i.e., accept or reject) or not may be determined based on the final matching score (e.g., step 1050).

In the example of FIG. 10, the ridge line point feature is not extracted because the memory consumption of the ridge point feature extraction and matching is relatively large. According, in the example shown in FIG. 10, a more accurate fingerprint identification result may be obtained than comparative examples which do not consider any minutia surrounding information, while still maintaining a low amount of calculation and memory required. Compared with a fingerprint identification method based only on the minutia feature matching, the fingerprint identification method of FIG. 10 only marginally increases the complexity, memory and delay. Therefore, it may be applied to lightweight embedded devices such as a smart card, etc.

As mentioned above, when performing the above respective feature matching, it is necessary to acquire a fingerprint feature template in advance of the matching process. A method of generating a fingerprint feature template is briefly described with reference to the example of FIG. 11. The method of generating a fingerprint feature template shown in FIG. 11 may be applied to a fingerprint recording process, that is, a process of recording the above target fingerprint in advance.

As shown in FIG. 11, after obtaining the image of the above target fingerprint, the minutia features may be extracted (e.g., step 1110), and then the number of ridge lines between each minutia and its N neighbors (i.e., neighbor minutiae) may be extracted (e.g., step 1120). Then, the coordinates of the block with size N*N, oriented and positioned in the direction of the position where the minutia is located in the direction graph, may be obtained by centering on each minutia, respectively (e.g., step 1130). Next, the binary information is extracted from the image of the target fingerprint based on the coordinates of the block with size N*N, that is, the binary pixel information in the block with size N*N is extracted (e.g., step 1140). For example, the binary information may be extracted from a binary image that is extracted from the image of the target fingerprint. Subsequently, the gray mean value and the variance are calculated on a gray level image of the target fingerprint based on the coordinates of the block with size N*N (e.g., step 1150). In this way, the gray level information in the block with size N*N is extracted. Finally, the above extracted features and information may be used to form a fingerprint feature template (e.g., step 1160). The obtained fingerprint feature template may be saved in a predetermined storage location for use in the subsequent feature matching. It should be noted that although some of the minutia surrounding features mentioned above are extracted in the example of FIG. 11, FIG. 11 is only an example. Any one and any combination of minutia surrounding features mentioned above may be extracted and combined with the minutia features to form the fingerprint feature template.

FIG. 12 is a flow diagram an example of the fingerprint identification method in accordance with embodiments of the present disclosure.

In the example of FIG. 12, firstly, the minutia feature matching algorithm is used to match the minutia features between a fingerprint to be identified and a target fingerprint (step 1210) to obtain the matched minutia pair and the matching score (step 1220). Then the matching check may be performed based on the ridge line number feature (step 1230), the minutia surrounding information (step 1240), and/or based on the neighbor minutia features (step 1250) to obtain the matching score(s). For example, when performing the matching check based on the neighbor minutia features, first, an overlapping area of the matched minutiae (i.e., the maximum common area mentioned above) is calculated, the number of neighbors in the area (i.e., the number of neighbor minutiae) is counted, and matching is performed based on the number of neighbors to obtain the matching score. Next, the matching scores obtained from the above various matchings are fused (step 1260). If the final fused matching score is greater than a threshold (determined at step 1270), it is considered that the currently input fingerprint comes from the same finger as the target fingerprint that is recorded in advance, and it is determined that the fingerprint verification passes (i.e., accept, at step 1280), otherwise, it is considered to come from a different finger, and it is determined that the fingerprint verification fails (i.e., reject, at step 1290).

Above, a fingerprint identification method according to embodiments of the present disclosure has been described in conjunction with FIGS. 1 to 12. According to the above fingerprint identification method, after obtaining the minutia matching pair and the first matching result of the fingerprint to be identified based on the minutia features of the fingerprint to be identified and the minutia features of the target fingerprint, the minutia surrounding features of each minutia of the fingerprint to be identified in the minutia matching pair are further obtained, and the matching check is performed based on the obtained minutia surrounding features and the pre-stored minutia surrounding features of the target fingerprint to obtain the second matching result. The identification result of the fingerprint to be identified is determined according to the second matching result and the first matching result, which may result in the final fingerprint identification result being more accurate.

According to embodiments of the present disclosure, a method of identifying fingerprint includes determining a first matching score based on matched minutiae between a captured fingerprint and a reference fingerprint. Then, the method performs additional matching check(s) based on information relating to the matched minutiae, such as information about detail surrounding the minutiae and/or between the minutiae, which provides one or more second matching scores. The algorithm then combines these scores to generate a final score to determine if the captured fingerprint is from the same finger as the reference fingerprint. The combination of these techniques requires a relatively low computation and memory cost, and offers increased accuracy, especially when implemented in devices only capable of capturing partial fingerprints.

Figure 13:
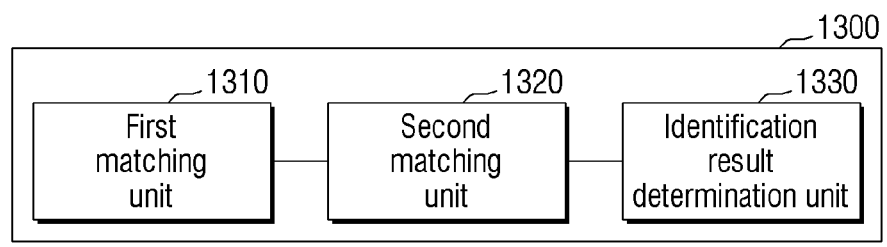
FIG. 13 is a block diagram of a fingerprint identification device in accordance with embodiments of the present disclosure.

FIG. 13 is a block diagram of a fingerprint identification device 1300 in accordance with embodiments of the present disclosure.

Referring to FIG. 13, the fingerprint identification device 1300 may include a first matching unit 1310, a second matching unit 1320, and an identification result determination unit 1330. For example, the first matching unit 1320 may be configured to obtain minutia matching pairs and a first matching result of a fingerprint to be identified, based on minutia features of the fingerprint to be identified and minutia features of a target fingerprint. The second matching unit 1330 may be configured to acquire minutia surrounding features of each minutia of the fingerprint to be identified in the minutia matching pairs, and perform a matching check on the minutia matching pairs based on the obtained minutia surrounding features and the pre-stored minutia surrounding features of the target fingerprint to obtain a second matching result of the fingerprint to be identified. An identification result determination unit 1340 is configured to determine an identification result of the fingerprint to be identified according to the second matching result and the first matching result.

The aforementioned units, such as those mentioned in FIG. 13, may be implemented through hardware, software, or a combination thereof. For example, some units may be implemented in memory and executed through a processor operable to execute a set of instructions. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein. As discussed above, any of the units may include a trained component, which may comprise a neural network structure that includes a model which has been optimized to perform the functions discussed herein, such as the identification of features surrounding minutiae.

In the above, the details involved in the specific operations performed by the first matching unit 1310, the second matching unit 1320 and the recognition result determination unit 1330 have been described. Any relevant details involved in the operations performed by the above-mentioned units may be seen in the corresponding descriptions about FIGS. 1 to 12.

In addition, it should be noted that although the fingerprint identification device 1300 is divided into units for performing corresponding processes, rit is clear to those skilled in the art that the processes performed by the above respective units may also be performed when the fingerprint identification device 1300 is not divided into any specific unit or there is no clear demarcation between respective units. In addition, the fingerprint identification device 1300 may further include other units, for example, a storage unit, etc.

Figure 14:
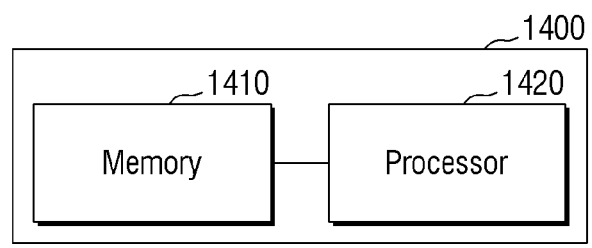
FIG. 14 is a block diagram of an electronic apparatus in accordance with embodiments of the present disclosure.

FIG. 14 is a block diagram of an electronic apparatus in accordance with embodiments of the present disclosure.

Referring to FIG. 14, the electronic apparatus 1400 may include at least one memory 1410 and at least one processor 1420. The at least one memory stores computer executable instructions, when executed by at least one processor, causes at least one processor 1420 to execute the fingerprint identification method according to embodiments of the present disclosure.

As an example, the electronic apparatus may be a PC, a tablet device, a personal digital assistant, a smart phone or other devices capable of executing the above instruction set. Here, the electronic apparatus does not have to be a single electronic apparatus, but may also be an assembly of any device or circuit capable of executing the above instructions (or instruction set) alone or jointly. The electronic apparatus may also be a part of an integrated control system or system manager, or may be configured as a portable electronic apparatus interconnected with local or remote (e.g., via wireless transmission) by an interface.

The processor may run instructions or codes stored in the memory, wherein the memory may further store data. Instructions and data may further be transmitted and received through the network via a network interface device, wherein the network interface device may adopt any known transmission protocol.

The memory may be integrated with the processor, for example, an RAM or a flash memory may be arranged in an integrated circuit microprocessor and the like. In addition, the memory may include independent devices, such as an external disk drive, a storage array, or other storage devices that can be used by any database system. The memory and the processor may be operatively coupled, or may communicate with each other, for example, through an I/O port, a network connection, etc., so that the processor can read files stored in the memory.

In addition, the electronic device may further include a video display (such as a liquid crystal display) and a user interaction interface (such as a keyboard, a mouse, a touch input device, etc.). All components of the electronic device may be connected to each other via a bus and/or network.

According to embodiments of the present disclosure, a computer readable storage medium storing instructions may be further provided, which, when the instructions are executed by at least one processor, causes at least one processor to execute the fingerprint identification method according to the embodiments of the present disclosure. Examples of the computer readable storage medium here include: read only memory (ROM), random access programmable read only memory (PROM), electrically erasable programmable read only memory (EEPROM), random access memory (RAM), dynamic random access memory (DRAM), static random access memory (SRAM), flash memory, nonvolatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, blu-ray or optical disk memory, hard disk drive (HDD), solid state hard disk (SSD), card memory (such as multimedia card, secure digital (SD) card or extreme speed digital (XD) card), magnetic tape, floppy disk, magneto-optical data storage apparatus, optical data storage apparatus, hard disk, solid state disk and any other apparatus, and the any other apparatus is configured to store a computer program and any associated data, data files and data structures in a non-temporary manner and provide the computer program and any associated data, data files and data structures to a processor or computer so that the processor or computer can execute the computer program. The instructions or computer program in the above computer readable storage medium may run in an environment deployed in a computer device such as a client, a host, a proxy apparatus, a server, etc., in addition, in one example, the computer program and any associated data, data files and data structures are distributed on a networked computer system, so that a computer program and any associated data, data files, and data structures are stored, accessed, and executed in a distributed manner through one or more processors or computers.

Those skilled in the art will appreciate and be able to conceive other implementation solutions of the present disclosure after considering the description and practicing the invention disclosed here. The present application aims to cover any modification, use or adaptive change of the present disclosure, which follow the general principles of the present disclosure and include the common knowledge or customary technical means in the present technical field not disclosed in the present disclosure. The description and embodiments provided for example purposes, and the scope and spirit of the present disclosure are defined by the following claims.

What is claimed is:

1. A method for identifying fingerprints, comprising:
   capturing a fingerprint by a fingerprint sensor and identifying matching pairs of minutiae between the captured fingerprint and a reference fingerprint;
   calculating a first matching result based on the minutia matching pairs;
   identifying minutia surrounding features for each minutia of the captured fingerprint in the minutia matching pairs;
   determining, for each minutia in the minutia matching pairs, whether the minutia surrounding features of the captured fingerprint match with minutia surrounding features of the reference fingerprint;
   calculating a second matching result based on a result of the determining;
   adjusting the first matching result based on the second matching result to generate an adjusted matching result; and
   generating an identification result based on the adjusted matching result.

2. The method for identifying fingerprints of claim 1, wherein the minutia surrounding features include fingerprint direction strength information, binary pixel information, or gray information of the periphery of the minutia.

3. The method for identifying fingerprints of claim 2, wherein the identifying of minutia surrounding features, and determining, for each minutia in the minutia matching pairs, whether the minutia surrounding features of the captured fingerprint match with minutia surrounding features of the reference fingerprint comprise:
   extracting minutia surrounding features of the minutia of the captured fingerprint in each minutia matching pair based on an image of the captured fingerprint;
   acquiring pre-stored minutia surrounding features of the minutiae of the reference fingerprint; and
   for each minutia matching pair, matching the minutia surrounding features of the minutia of the captured fingerprint in the minutia matching pair with the minutia surrounding features of the reference fingerprint and obtaining the second matching result based on the matching.

4. The method for identifying fingerprints of claim 3, wherein the identifying minutia surrounding features for each minutia of the captured fingerprint in the minutia matching pairs comprises:
generating a block, wherein the block has a predetermined size and is centered on the minutia of the captured fingerprint in each minutia matching pair in the image, and performing only one, only two, or all of following operations:
calculating a gradient in the block, and calculating, based on the calculated gradient, fingerprint direction strength in the block as the fingerprint direction strength information;
acquiring binary information of each pixel in the block, as the binary pixel information; and
calculating a gray mean value and gray variance in the block, as the gray information.

5. The method for identifying fingerprints of claim 4, wherein the generating of the block with a predetermined size centered on the minutia of the captured fingerprint in each minutia matching pair in the image comprises:
generating a fingerprint direction graph of the captured fingerprint; and
determining a direction of the block based on the fingerprint direction graph,
wherein the direction of the block is based on where the minutia is located in the fingerprint direction graph.

6. The method for identifying fingerprints of claim 3, wherein the determining, for each minutia in the minutia matching pairs, whether the minutia surrounding features of the captured fingerprint match with minutia surrounding features of the reference fingerprint and the calculating a second matching result based on the determination comprise performing only one, only two, or all of following operations:
for each minutia matching pair, checking whether or not the fingerprint direction strength information of the periphery of the minutia matching pair matches, and obtaining the second matching result according to the matching;
for each minutia matching pair, checking whether or not the binary pixel information of the periphery of the minutia matching pair matches, and obtaining the second matching result according to the matching; and
for each minutia matching pair, checking whether or not the gray information of the periphery of the minutia matching pair matches, and obtaining the second matching result according to the matching.

7. The method for identifying fingerprints of claim 6, wherein the minutia surrounding features further comprise: information about a ridge point of a ridge line where the minutia is located, information about the number of ridge lines between the minutia and a neighbor minutia, or information about the number of neighbor minutiae of the minutia in a maximum common area that the corresponding minutia matching pair has.

8. The method for identifying fingerprints of claim 7, wherein the determining, for each minutia in the minutia matching pairs, whether the minutia surrounding features of the captured fingerprint match with minutia surrounding features of the reference fingerprint and the calculating a second matching result based on the determination further comprise performing only one, only two, or all of following operations:
for each minutia matching pair, checking whether or not the ridge points of the ridge lines where the minutia matching pair is located match, and obtaining the second matching result based on the ridge point according to the matching;
for each two minutia matching pairs, checking whether or not the numbers of ridge lines corresponding thereto are similar, and obtaining the second matching result based on the numbers of ridge lines according to a similarity threshold; and
for each minutia matching pair, checking whether or not the numbers of the neighbor minutiae in a maximum common area of minutia matching pair has are similar, and obtaining the second matching result based on the numbers of the neighbor minutiae according to the similarity threshold.

9. The method for identifying fingerprints of claim 1, wherein the adjusting the first matching result based on the second matching result to generate the adjusted matching result comprises:
if the matching of the minutia surrounding features succeeds, increasing a value of the first matching result; and
if the matching of the minutia surrounding features fails, decreasing the value of the first matching result, wherein a degree of adjustment to the first matching result is associated with a value of the second matching result.

10. An electronic apparatus, comprising:
at least one processor; and
at least one memory which stores computer executable instructions, wherein the computer executable instructions, when being executed by the at least one processor, cause the at least one processor to execute the method for identifying fingerprints of claim 1.

11. The method for identifying fingerprints of claim 1, wherein the adjusting of the first matching result based on the second matching result comprises modifying the first matching result by an amount that varies according to a value of the second matching result, wherein the value of the second matching result reflects a degree of matching between the surrounding features of the captured fingerprint match and the minutia surrounding features of the reference fingerprint.

12. A fingerprint identification device, comprising:
a fingerprint sensor configured to capture a fingerprint;
a first matching unit configured to obtain minutia matching pairs between the captured fingerprint and a reference fingerprint, and to calculate a first matching result based on the minutia matching pairs;
a second matching unit configured to identify minutia surrounding features for each minutia of the captured fingerprint in the minutia matching pairs, and to determine for each minutia in the minutia matching pairs, whether the minutia surrounding features of the captured fingerprint match with pre-stored minutia surrounding features of the reference fingerprint to obtain a second matching result; and
an identification result determination unit configured to adjust the first matching result based on the second matching result to generate an adjusted matching result and determine an identification result based on the adjusted first matching result.

13. The fingerprint identification device of claim 12, wherein the minutia surrounding features comprise: fingerprint direction strength information, binary pixel information, or gray information of the periphery of the minutia.

14. The fingerprint identification device of claim 13, wherein the identifying of minutia surrounding features of each minutia of the captured fingerprint in the minutia matching pairs, and the obtaining of a second matching result comprise:
   extracting minutia surrounding features of the minutia of the captured fingerprint in each minutia matching pair based on an image of the captured fingerprint;
   acquiring pre-stored minutia surrounding features of the minutiae of the reference fingerprint;
   for each minutia matching pair, matching the minutia surrounding features of the minutia of the captured fingerprint in the minutia matching pair with the minutia surrounding features of the reference fingerprint and obtaining the second matching result according to the matching.

15. The fingerprint identification device of claim 14, wherein the extracting of minutia surrounding features of the minutia of the captured fingerprint in each minutia matching pair based on an image of the captured fingerprint comprises:
   determining a block with a predetermined size that is centered on the minutia of the captured fingerprint in each minutia matching pair in the image, and performing only one, only two, or all of following operations:
   calculating a gradient in the block and calculating, based on the calculated gradient, fingerprint direction strength in the block as the fingerprint direction strength information;
   acquiring binary information of each pixel in the block as the binary pixel information; and
   calculating a gray mean value and gray variance in the block, as the gray information.

16. The fingerprint identification device of claim 15, wherein the determining of a block with a predetermined size centered on the minutia of the captured fingerprint in each minutia matching pair in the image comprises:
   generating a fingerprint direction graph of the captured fingerprint, and determining a direction of the block based on the fingerprint direction graph, wherein the direction of the block is based on where the minutia is located in the fingerprint direction graph.

17. The fingerprint identification device of claim 14, wherein, in the determining for each minutia in the minutia matching pairs, whether the minutia surrounding features of the captured fingerprint match with pre-stored minutia surrounding features of the reference fingerprint to obtain a second matching result comprises performing only one, only two, or all of following operations:
   for each minutia matching pair, checking whether or not the fingerprint direction strength information of the periphery of the minutia matching pair matches, and obtaining the second matching result based on the fingerprint direction strength information according to the matching;
   for each minutia matching pair, checking whether or not the binary pixel information of the periphery of the minutia matching pair matches, and obtaining the second matching result based on the binary pixel information according to the matching; and
   for each minutia matching pair, checking whether or not the gray information of the periphery of the minutia matching pair matches, and obtaining the second matching result based on the gray information according to the matching.

18. The fingerprint identification device of claim 17, wherein the minutia surrounding features further comprise:
   information about a ridge point of a ridge line where the minutia is located, information about the number of ridge lines between the minutia and a neighbor minutia, or information about the number of neighbor minutiae of the minutia in a maximum common area that the corresponding minutia matching pair has.

19. The fingerprint identification device of claim 18, wherein in the determining for each minutia in the minutia matching pairs, whether the minutia surrounding features of the captured fingerprint match with pre-stored minutia surrounding features of the reference fingerprint to obtain a second matching result further comprises performing only one, only two, or all of following operations:
   for each minutia matching pair, checking whether or not the ridge points of the ridge lines where the minutia matching pair is located match, and obtaining the second matching result based on the ridge point according to the matching;
   for each two minutia matching pairs, checking whether or not the numbers of ridge lines corresponding thereto are similar, and obtaining the second matching result based on the numbers of ridge lines according to a similarity threshold; and
   for each minutia matching pair, checking whether or not the numbers of the neighbor minutiae in a shared maximum common area of the minutia matching pair are similar, and obtaining the second matching result based on the numbers of the neighbor minutiae according to the similarity threshold.

20. The fingerprint identification device of claim 12, wherein the adjust the first matching result based on the second matching result to generate the adjusted matching result comprises:
   if the matching of the minutia surrounding features succeeds, increasing a value of the first matching result; and
   if the matching of the minutia surrounding features fails, decreasing the value of the first matching result,
   wherein a degree of adjustment to the first matching result is associated with a value of the second matching result.

* * * * *